Patented Nov. 17, 1953

2,659,674

UNITED STATES PATENT OFFICE 2,659,674

METHOD OF TONING PHOTOGRAPHS AND COMPOSITION THEREFOR

Olan Robert Hyndman, Denver, Colo.

No Drawing. Application April 5, 1948,
Serial No. 19,169

8 Claims. (Cl. 95—88)

This invention relates to new and useful improvements in color photography and more particularly to improved methods of and means for imparting color or tone to the usual silver image film or so-called black-and-white photograph.

In the art of color photography, various methods are now known and in use for coloring the usual black-and-white photographs and probably one of the best known is the "toning" method wherein the entire photograph is toned or colored a desired color. This may be accomplished either by "chemical toning" or by "dye toning" but in both instances, the result is a photograph of one color only with the color image being reproductive of the initial black-and-white image in gradation, intensity and definition. To produce a photograph having a plurality of colors, a "multiple toning" process is in use wherein it is necessary to block out all of the image except that portion to which a certain color is to be applied; the color is then applied by any usual toning method. After the first color is imparted to the desired portion of the image, the blocking out step is repeated, another portion of the image is imparted with the second chosen color, and the blocking out and coloring are continued successively until the final multiple colored or toned photograph is produced. It will be evident that this procedure not only requires considerable time and effort but also necessitates more or less experienced technique.

In addition to the foregoing "toning" methods, colored photographs are produced by first producing colored positive images in primary colors which may then be matched as to color value and intensity to form, when combined or assembled in registry, a colored print which covers the full color range of the object photographed. This method varies from the toning methods in that it accurately reproduces the actual colors of the photographed subject but because of its complicated and highly technical procedure must be performed by expert technicians and cannot be carried out easily by the ordinary amateur or hobbyist.

It is one object of the invention to provide a simple differential toning method or process, whereby various colors are imparted to an ordinary black-and-white photograph.

Another object of the invention is to provide an improved method or process for imparting "multiple toning" to the silver image of an ordinary film or usual black-and-white photograph without the necessity of blocking out portions of the image or of producing a plurality of colored positive images in the primary colors, whereby any relatively inexperienced person, such as the amateur camera hobbyist may practice the method to obtain pleasing results.

An important object of the invention is to provide an improved method for producing multiple colors in a silver image photograph wherein the photograph is immersed within a solution which reacts with the silver in said photograph in accordance with the density of said silver to produce various color effects, whereby the result is a multi-colored photograph which is reproductive of the initial black-and-white photograph in gradation, intensity and definition.

Another object of the invention is to provide an improved method for producing a multiple tone photograph wherein the photograph is immersed in a solution of chromic acid and sodium thiosulphate, whereby certain portions of the finely divided silver in the photograph are unaffected, certain other portions are converted to silver chromate and other portions are replaced by chromium, with the result that different colors or tones, which depend upon the density of the silver deposit in accordance with the particular ratio of the elements in the solution, are produced.

A particular object of the invention is to provide an improved method for producing multiple tones or colors in an ordinary black-and-white photograph, wherein the photograph is immersed in a solution containing chromic acid and a suitable agent which functions to retard the action of the chromic acid on the finely divided silver of the photograph, whereby certain portions of said silver deposit are unattacked, other portions are partially affected and still others react unimpeded with said chromic acid, all in accordance with the density of the silver deposit, whereby a plurality of colors or tones are produced in a single immersion operation.

Still another object of the invention is to provide an improved method of the character described, wherein a plurality of colors or tones are produced by the immersion of the photograph in a chromic acid-inhibitor solution, after which the photograph is immersed in a blue toning solution whereby a blue color is imparted to all of the silver which remained uncolored in the first immersion; the blue toning solution being such that the colors produced in the first immersion step are not affected.

A still further object of the invention is to provide an improved solution for coloring photographs which comprises chromic acid admixed with a suitable agent, such as sodium thiosulphate or ordinary "hypo," which is capable of retarding the reaction of the chromic acid with certain portions of the finely divided silver deposit of the photograph, whereby accurate control of the colors produced by the reaction may be had.

Still another object of the invention is to provide an improved "blue toning" solution in which a photograph which has been previously "multiple toned" may be immersed without masking or blocking out said photograph, whereby the uncolored portions of said photograph may be colored blue without affecting or changing the previously applied colors.

Other objects and advantages of the invention will become apparent during the course of the following description and of the appended claims forming a part thereof.

The improved method or process is applicable to the ordinary black-and-white photograph or to the usual film or "transparency" but will be described as applied to the former. As used herein, the term "image" denotes the original image area as defined by the finely divided silver deposit.

The general method

The method or process by which multiple colors or tones are imparted to the photograph may be said to comprise two stages, with the second stage being entirely optional. In other words, the colored photograph may be considered complete after it has passed through the first stage and the second stage is merely additive to the results produced in said first step.

The first stage of the method imparts or produces a plurality of colors or tones in the photograph, with said colors varying in accordance with the depths of shadows or gradations in the photograph. For the purposes of this description, the chemical reaction which occurs in the first step of the method to produce the various colors will be identified and referred to herein as the "chromatization" of the photograph. However, this first stages leaves the extremely light portions or areas of the photograph substantially unaffected so that said light portions or "high lights" remain substantially white or gray in color. Since the remaining portions of the image are colored, a pleasing and effective colored photograph is produced any may, if desired, be considered complete.

The light portions or areas of the usual photograph are of the background and in the case of outdoor photographs, the sky ordinarily comprises the major part of such areas. Thus, it becomes evident that in particular types of photographs it may be more desirable to impart a blue color to the lighter areas and "high lights" and it is in such cases that the photograph may be subjected to the second stage of the method. This second stage may be referred to as a "blue toning" step and functions to impart a blue color to all of the lighter areas and "high lights" of the photograph without affecting or changing the original colors produced in the first stage. It is noted that it is not necessary at any time to mask out or cover any portion of the photograph during either the first or second stage. Also, both stages of the improved method or process contemplate the immersion of the photograph into chemical solutions which produces the improved results in a simple and speedy manner, whereby any inexperienced person may perform the method.

"Chromatization" stage

As has been noted, the chemical reaction produced in the first stage of the process will be designated as "chromatization" which is intended to mean the conversion of portions of the silver deposit making up the image of the photograph into other elements producing varying colors. In carrying out the method, the black-and-white photograph which has been developed in any well-known manner is first thoroughly washed to remove grease, dirt, hypo fixer or other extraneous matter.

The cleansed photograph is then immersed in a solution of chromic acid and sodium thiosulphate, the latter being ordinary hypo fixer such as is widely used in "fixing" photographs. A solution of chromic acid and hypo deteriorates or disintegrates rather rapidly and the photograph should be immersed into the solution as soon as practicable after mixing of said solution; as a practical matter it has been found that complete disintegration of the solution so as to render it ineffective for the purposes of the present method occurs from five to six minutes. While immersed in the solution, it is desirable to slowly agitate the photograph to insure complete contact of the solution with the silver deposit on the photograph. As the chromic acid-hypo solution reacts with the silver deposit on the photograph, a change in color in the photograph occurs and the depth or tone of the colors produced varies, as will be explained, in accordance with the particular solution and with the time of immersion. The time of immersion is not critical to the method but can be varied in accordance with the end result being sought. In the ordinary photograph, thirty to ninety seconds will produce desirable and pleasing colors. The colors produced by "chromatization" will vary from a chocolate or deep brown, almost black, in the deeper shadows of the photogrph, through various brown, red-brown, reddish and green shades in the varying intermediate shadows of said photograph. The light portions and "high lights" in the photograph will remain substantially unchanged or present a slight bluish cast.

After the color change has occurred in the chromic acid-hypo solution, which change incidentally is clearly visible during immersion, the photograph is withdrawn and immediately placed in a stop solution, such as sodium carbonate which halts any further action of the chromic acid-hypo solution on the silver deposit of the photograph. The immersion in the stop solution also clears the paper of the yellowish colored chromic acid. A treatment of one to two minutes in the sodium carbonate has been found satisfactory.

The photograph is then thoroughly washed and at this time has the varying colors which were produced by the "chromatization" step. However, the colors are rather flat and lack lustre, although said colors are distinctive and the photograph has considerably more appeal and effectiveness than as an original black-and-white. To emphasize the colors and bring them out into more distinctive sharpness, the photograph is preferably immersed in a sodium hydrosulphite developer, although any reducing and developing agent, such as Eastman Kodak's D72 developer, may be employed. Developer D72 consists of water (about 125° F.), 16 avoirdupois ounces; Kodak Elon developing agent, 45 avoirdupois grains; sodium sulfite, 1½ ounces avoirdupois; hydroquinone, 175 grains avoirdupois; sodium carbonate monohydrated, 290 grains avoirdupois; potassium bromide, 30 grains avoirdupois; water to make, 32 grains avoirdupois. The development agent accentuates the colors produced by the "chromatization" step and a pleasing color photograph is produced.

As has been noted, the photograph is colored, with the colors being controlled to some degree by the depth of the shadows in the photograph. Although the light portions or areas are substantially unaffected, the coloring of the remaining portions of the photograph causes said lighter portions to take on a bluish cast, resulting possibly from the contrast of the other colors to the normal color of the silver deposit making up said lighter areas. As has been stated, the photograph may be considered complete at this time since said photograph has various colors, ranging from the deep brown or black in the deep shadows, through the various shades of brown, red-browns and reds, to green and the bluish-cast lighter areas. Further colors, such as various shades of green are produced because certain of the silver areas are only partially converted to shades of brown or reddish brown which combining with the remaining bluish silver in additive relationship result in greens. The particular colors which ultimately result are dependent upon the density of the silver deposit in the image and also upon the ratio of the sodium thiosulphate or hypo to the chromic acid in the chromic acid-hypo solution within certain limits. Thus, different and desired color effects in the photograph may be attained.

The "chromatization" solution

The production of a plurality of colors or tones by merely immersing the photograph in the single chromic acid-sodium thiosulphate or hypo solution is the important and advantageous feature of the method. As has been indicated the solution is subject to some variation within certain limits as to the ratio of the chromic acid to the hypo or sodium thiosulphate. The chemical reaction which results from the immersion of the photograph within the solution is controlled by three factors; first, the particular solution, second, the density of the silver deposit in the various portions or areas of the photograph, and third, the length of time of immersion. A variation in any one of these factors will change the particular color shades or tones which are produced in the final product.

It is well known that upon immersion of a black-and-white photograph or print in a solution of chromic acid, a reaction occurs wherein chromium replaces the finely divided silver with the result that the entire photograph is colored brown. Upon development in the usual reducing agents including sodium hydrosulphite the brown chromium will be reduced to black and the result is an intensification of the original image.

The improved solution employed in the present method includes the addition of ordinary hypo or sodium thiosulphate to the chromic acid and the ratio of the hypo to the chromic acid is subject to some variation. The inclusion of the hypo in the solution causes the formation of silver chromate in certain areas of the image with the result that those areas are imparted with a red and red-brown color. The particular color or tone varies in accordance with the density of the silver deposit. Although it is difficult to prove, it is believed that the hypo or sodium thiosulphate acts as an inhibitor to inhibit the action of chromic acid on finely divided silver; however, it is entirely possible that the hypo becomes incorporated in the chemical change. At any rate by adjusting or varying the amount of the hypo in the solution, it is possible to control the areas of the image which will be acted upon. If a greater amount of hypo is used in the solution, action upon all of the lighter areas of the photograph where the silver deposit is less dense will be prevented, while lesser hypo will result in the chromic acid affecting a greater area of the entire image. In the denser silver deposits, that is, in the deeper shadows of the image, the reaction potential is greater and is sufficient to overcome the hypo with the result that silver chromate is formed.

The effect of the hypo or sodium thiosulphate which retards or prevents the reaction of the chromic acid with finely divided silver makes it possible to readily control the desired end result. With a given concentration of chromic acid, the denser silver deposits require a greater amount of hypo to protect them from the chemical reaction identified herein as "chromatization" than do the lighter silver deposits. As the amount of hypo is increased, the chemical reaction or chromatization is shifted to the darker or denser deposits of silver, with all of the less dense deposits being unaffected. It is possible to add sufficient hypo to the solution to completely prevent or inhibit the action of the chromic acid on any of the silver. On the other hand, it is also possible to provide insufficient hypo in the solution, in which event all of the silver deposits, even the extreme lighter areas of the image would be acted upon to cause a color change to the brown tone.

The particular chromic acid-hypo solution is preferably so adjusted so that the intermediate or middle shadows of the photograph are acted upon to form silver chromate with sufficient hypo to prevent any action on the silver constituting the lighter shadows. The dense silver deposits which form the darker shadows of the image will be only partly changed by the action of the hypo and because of their density will require additional time, as compared to the time of formation of the silver chromate in the intermediate shadows, to undergo complete change. Therefore, assuming that sufficient time is allowed for the chromic acid to react with the denser silver deposits, said deeper shadows will be partly replaced by chromium and partly replaced by silver chromate, the intermediate shadows will be represented by the silver chromate, and the lighter shadows will remain unaffected. It thus becomes obvious that the variation in the amount of hypo in the solution controls the action on the silver deposits which make up the different areas of the image.

In actual practice, the chromic acid-hypo solution is adjusted so that silver chromate is produced in the middle or intermediate shadows with no "chromatization" or change in the lighter shadows. The darker shadows begin a change as soon as the photograph is immersed but because of their density, more time is required to replace the dense silver deposits than is required to convert the middle or intermediate shadows to silver chromate. It might be noted that after the silver chromate is formed in the intermediate shadows, further change in this area stops. Hence at the time the middle or intermediate shadows have been converted and are complete for the purposes of this invention, the darker or denser shadows contain a mixture of silver, replacement chromium and silver chromate. If the photograph is allowed to remain in the solution until the reaction on the darkest shadows is complete, the dense silver deposits forming such shadows will be entirely replaced by chromium and silver chromate. In such event if the darkest shadow is exceptionally dark, as in a hard or contrasty print, chromium will replace the silver and present a black metallic lustre which is undesirable. Therefore, it is preferable, except when specially desired, not to use hard or contrasty photographs in which very black shadows prevail.

As outlined above, the variation in the concentration of the hypo or sodium thiosulphate will change or control the action on the image and this will result in the production of varying shades or tones. The concentration of chromic acid, too, is of importance but as the concentration of chromic acid is increased, the concentration of hypo must also be increased for equivalent effects on the picture. Also, it has been found that the relation or ratio of the hypo to chromic acid is not a linear function. For example, if the concentration of chromic acid is doubled, the concentration of hypo must be at least tripled or more nearly quadrupled to produce equivalent results.

Because the particular solution is variable in accordance with the end results being sought, the invention is not to be limited to any specific amounts of chromic acid and sodium thiosulphate; however, the following is an example of a solution which has been found satisfactory in coloring the average print or photograph:

22 cc. chromic acid (strength, 4¼ ounces to quart)
10 cc. sodium thiosulphate (ordinary hypo; 1¾ ounces to quart)
1 pint water The above solution is directed toward the formation of silver chromate in the intermediate shadows with no effect on the lighter shadows and a partial reaction on the deeper shadows. It is noted that the solution disintegrates rapidly and it is therefore necessary that the photograph be immersed into said solution as soon as practicable after the same is mixed.

In immersing the ordinary photograph in the foregoing solution, the action of the chromic acid on the finely divided silver in the presence of the fresh hypo depends upon the density of the silver deposit which density, of course, determines the depth of the shadow in the image. Therefore, the denser the shadow, the greater the reaction potential. In the lighter shadows the density of the silver deposit is slight and the hypo inhibits or prevents the chromic acid from acting on these lighter areas with the result that they remain unaffected.

Reaction on the remainder of the silver deposits forming the image begins immediately and the reaction proceeds by converting the silver granules in a somewhat mosaic pattern. In the lighter middle or intermediate shadows, the density of the silver is such that this portion will be only partially "chromatized," that is, up to a certain point this portion will react, after which reaction proceeds no further, due to the fact that the reaction potential is reduced to inactivity. It is assumed that some of the silver granules in this portion are converted to silver chromate with the remaining granules being unaffected so that a particular shade or tone is produced by the intermingled granules.

The darker intermediate shadows slightly denser than those wherein a partial "chromatization" occurs will "chromatize" completely. This action in this area results in the formation of silver chromate throughout said area to produce a red color.

The darkest shadows in the photograph represented by the densest silver deposits will have been acted upon by the chromic acid but because of their density the majority of the silver granules in these deposits will not have reacted so that said shadows will appear for the most part their original black. However, it is evident that these darkest shadows will contain some converted silver chromate and also some replacement chromium. Therefore, when the photograph is removed from the solution, it will contain areas which are unaffected, areas which are partially "chromatized" wherein there is an admixture of silver chromate and silver, other areas having converted silver chromate and still others containing silver chromate and replacement chromium. The degree or amount of change which has been produced will vary with the density of the silver deposits and the time of immersion but in all cases a wide range of color variation is obtained.

As to actual colors produced, the unaffected portions of the photograph which are the lighter areas, such as sky background, remain unchanged. The lighter parts of the intermediate shadows wherein partial "chromatization" occurs produce green possibly because of the yellowish red of the silver chromate and the bluish-cast of the unchanged silver in additive color relationship. From the green, the color blends from green to red in the darker portions of the intermediate shadows, and thence from red to red-brown and chocolate and finally to black in the deepest shadows. The unchanged silver representing the light shadows or "high lights" of the image assumes a bluish-cast, possibly due to the contrast of the unchanged silver to the other colors or possibly because a few scattered granules of silver are converted to silver chromate and this in additive relationship with the pale blue of silver gives the resulting bluish cast.

As has been explained, the photograph is removed from the chromic acid-hypo solution and is immersed in a sodium carbonate solution to stop any further action or "chromatization" and to cleanse the paper of the yellowish chromic acid. Approximately one to two minutes in the stop solution is sufficient after which the photograph is thoroughly washed. Following washing, the photograph is immersed in a suitable reducing and developing agent, such as sodium hydrosulphite, wherein the colors are well blended and accentuated. The colors so produced are permanent and, if desired, the photograph may be considered complete at this point.

The second stage

It may be desirable in certain photographs, particularly in scenic views wherein the sky provides a considerable light background, to carry the photograph through the second stage to apply or impart a blue color to the light areas and the high lights of the photograph. As explained, the first stage which will provide a complete photograph in most cases where a blue color is not desired, does not produce any substantial blue coloring. Thus, the process by which the blue color is imparted or applied to the light areas and high lights may be referred to as a second or subsequent stage. This stage consists of taking the colored photograph through any well known "blue toning" process which will not substantially affect or delete the colors already produced. In other words, any blue toning process which will not be detrimental to the colors previously produced would be applicable for this second stage and will impart a blue or desired shade in the lighter areas and high lights of the picture. Obviously the depth of color may be controlled in such process by well known means.

As an example of a blue toning process which has been found satisfactory in the present method, the colored photograph is immersed within a solution which may consist of the following:

10 cc. potassium ferricyanide (strength, 1 ounce to the quart)
10 cc. ferric chloride (strength, 1 ounce to the quart)
10 cc. oxalic acid (strength, 1 ounce to the quart)
10 cc. concentrated hydrochloric acid
1 quart water The photograph is immersed and slowly agitated in this solution until the desired depth of blue color (Prussian blue) appears in the lighter areas and high lights of the picture. It has been found that this solution does not affect the various colors produced in the first stage so far as appearance is concerned; however, the chemical reaction changes the granules or particles of the cromium salt to an iron salt which is subject to oxidation and loss of red color after a time.

After removal from the "blue toning" solution the photograph is thoroughly washed after which it is immersed in a suitable dye for which the iron salt is a mordant. This dye may be of any selected color but it has been found that since the colors produced in the first stage have a majority of reddish hues, a red dye is desirable. The immersion into the dye functions not only to stabilize the colors of reddish hue which were originally imparted by the chromium salts but also greatly improves the color quality. The Prussian blue is stable without special treatment. It is noted that the reaction which changes the chromium salts to iron salts makes it necessary to immerse the photograph in the dye as the final step in order to make the colors permanent. In those cases where it may not be desired to retain the permanency, this final step may be omitted.

After immersion in the dye, the photograph is thoroughly washed until clear and said photograph is now complete with all lighter areas which were not affected by the first stage converted to a blue color. It might also be pointed out that the silver particles which were not converted into color during the first stage will be affected by the blue toning step, with the result that additional blue will be intermingled with the reds, red-browns and other colors. Thus, the blue toning step not only imparts the blue color to the light areas and high lights of the photograph but also combines with other colors previously produced in the first stage to enhance the final color appearance of the photograph. It has been found that the blue toning step definitely assists in bringing out the various shades of greens in the picture. Since the entire method is carried out by subjecting the silver deposit to the solutions, the colors obtained are in accordance with the gradation of the image so that a smooth blending of the colors is produced. As has been noted, the particular solution for producing the blue may be varied so long as the blue toning solution used does not convert the silver chromium salts to Prussian blue.

*Modifications of procedure in first stage*

The production of the multiple colors in the first step have been heretofore described as applied to a completed photograph, that is, one which has been properly developed and fixed. However, it is not essential to the practice of this invention that the photograph be fixed since the first stage of the present method may be carried out between the development and fixing of the photograph. In this instance, the photograph will be developed in the usual manner and then immersed in any of the well known "stop" solutions to halt further development. The photograph is then taken through the first stage of the method described herein, that is, it is immersed in the chromic acid-hypo solution wherein the silver deposits of the image are subjected to the action of said solution to bring out the various colors as above described. The photograph is then immersed in the sodium carbonate solution to stop further "chromatization" after which it is washed and "fixed" and then immersed in a suitable reducing and developing agent such as a sodium hydrosulphite developer. At this point all of the areas of the image, with the exception of the light areas and high lights thereof have been imparted with color. After development the photograph may then be subjected to the second stage or blue toning process as described.

It will be obvious that in this case, the image is subjected to the chromic acid-hypo solution between its development and fixing which has the advantage of eliminating any hypo in the photograph prior to its immersion in the chromic acid-hypo solution. It will be evident that since hypo is employed as a fixing agent, a finished photograph which has been fixed may not have all of the hypo removed therefrom. Any hypo remaining in the photograph would have some effect on the chromic acid-hypo solution since it would change the ratio of hypo to chromic acid; thus, by coloring the photograph before it has been fixed, the danger of any hypo left in the photograph is eliminated. However, it is entirely optional as to just when the photograph is passed through the coloring solution.

The method can also be carried out by permitting some of the ordinary hypo solution which is used in fixing the photograph to remain in the paper of said photograph. In other words, if the photograph is not thoroughly washed after fixing, some of the hypo will remain in said photograph. In this event, the photograph may be immersed within a chromic acid solution and the hypo remaining in the photograph by reason of the fixing thereof will affect the action of the chromic acid, in accordance with the ratio of hypo to acid, in exactly the same manner as where the solution of chromic acid and hypo is pre-mixed. In practicing the method in this manner, colors may be imparted to the various areas, in accordance with the silver deposit but it is obvious that in this method accurate control of the end result to be obtained is hardly possible. In other words, it would be most difficult to determine just how much of the hypo solution remained in the photograph and equivalent results could not be obtained on successive operations. For this reason, it is desirable to clear the photograph of any hypo solution and quantitatively control the hypo by mixing it in desired amounts with the chromic acid. However, it is noted that the coloring of the photograph may be accomplished by permitting some hypo to remain in the photograph and inserting it in the chromic acid although as above pointed out the end results cannot be accurately controlled with this procedure.

*Modification of "chromatization" stage*

From the foregoing description of the first or "chromatization" stage of the improved method, it will be evident that certain variables determine the effects obtained. As was pointed out, the concentration of chromic acid and the concentration of sodium thiosulphate are major factors in the results produced. A third variable in relation to the solution which is of importance is the acidity or pH of the solution. It has been found that if the solution is of alkaline titre as a result of having alkalinized the chromic acid with weak or strong bases, no reaction occurs with finely divided silver regardless of the concentration of chromic acid and sodium thiosulphate; this means that the solution must be acid to produce "chromatization." On the other hand, if the acidity of chromic acid is increased (pH decreased), the color contrast in the chromatized picture is increased, which means that each color is more or less distinct with relatively little blending between colors. It is believed that the increased acidity probably destroys the sodium thiosulphate more rapidly and also increases the reaction potential on the silver, with the result that the reaction time on the silver is shortened and the color change occurs at a more rapid rate. Thus, the areas of a given silver density will react largely to completion, rather than partially, and this produces sharp color contrast because the color contrast produced by chromatization is contingent upon the degree of complete "chromatization" in the various areas. To produce the most desirable effects, it is desirable that partial "chromatization" be effected, that is, reaction of a percentage of the silver granules in mosaic fashion.

As has been described, chromic acid itself is of an acidity which gives pleasing results; however, the final picture may be enhanced with softer gradation and blending of colors by slightly alkalinizing the chromic acid. When this is done, the concentration of sodium thiosulphate is reduced proportionally, which lengthens the reaction time. As an example, if 4 cc. of a 1½% solution of sodium carbonate or other alkalizing agent, is added to the pint of chromic acid solution described hereinbefore, the sodium thiosulphate in the solution is reduced from the 10 cc. mentioned to from 5 to 6 cc. This alkalinized solution requires a longer period of time for the reaction which produces the colors to occur but the final result is superior because the mosaic effect is spread over most of the photograph except in the very light shade of silver and hence there is a richer blend of final colors. The deep shadows are imparted with deep chocolate and brown and the intermediate shadows are rich in greens. The sky can be toned a deeper blue without unbalancing the remainder of the picture with blue. Although the alkalinized solution produces a more pleasing final result, it is again noted that its use is optional since excellent results are obtained with the chromic acid-hypo solution heretofore described.

*Application to portraits*

The improved method or process may be applied to any black-and-white photograph including portraits. However, a portrait differs from a landscape scene in that the face and all exposed skin are represented by a light silver deposit and it is, of course, undesirable to impart a blue color to these areas. Therefore, additional steps are added to the basic method where portraits are involved.

The portrait is subjected to the first or "chromatization" stage in exactly the manner hereinbefore described so that colors are imparted to the various areas except for the lighter portions which are the light silver deposits and which include the face and other exposed flesh. After the chromatization development and washing, the portrait is immersed in the basic fuchsin dye solution. Sufficient time is allowed together with some agitation to allow the dye toning to become complete on the chromatized silver which is a mordant for the dye. The excess dye is then washed off and the photograph cleared in a suitable solution, such as 1 to 2% sodium bisulphite.

The photograph or portrait is then laid on a flat surface, excess water being removed in any suitable manner and the face and exposed skin areas are covered with a copper mordanting solution. This solution may be readily applied by means of a hand brush. As an example, the following copper mordanting solution has been found suitable:

| | |
|---|---|
| Copper sulphate | 40 grams |
| Potassium citrate (neutral) | 250 grams |
| Acetic acid, glacial | 30 cc. |
| Potassium thiocyanate | 29 grams |
| Water to make | 1 liter |

(Dissolve the potassium thiocyanate in 50 cc. of water and add to the solution of other chemicals.)

The effect of the mordant is rapid and a reaction on both the silver and chromatized silver occurs. No appreciable difficulty is encountered in applying the same evenly and any ultimate lines of demarcation are substantially inevident since in the blue toning stage to which the photograph is subsequently subjected, the mordanted silver blends somewhat with the unmordanted at their line of junction.

Following the application of the copper mordanting solution, the portrait photograph is washed for about two minutes, after which it is immersed in the blue toning solution heretofore described in the second stage of the method. This solution abhors the copper toned silver and any of the copper toned chromatized silver in the areas to which the copper solution was applied and these areas are not colored blue. As the remainder of the photograph or portrait takes the blue in its appropriate portions, the flesh color of the face and skin stands out strikingly evident by contrast. If desired, the portrait or photograph may be considered complete at this point.

To increase the realistic appearance of the photograph or portrait, the copper mordanted areas, which remained uncolored, may be toned a definite flesh color by means of a toning solution which does not disturb the previously colored portions. An example of such a solution is the following:

| | |
|---|---|
| Basic fuchsin | 0.25 gram |
| Auromine | 0.25 gram |
| Acetic acid, glacial | 2 cc. |
| Water to make | 1 quart |

(Dissolve dyes in warm water and filter before diluting.)

After immersion in the flesh toning solution, the high lights in the photograph or portrait are cleared of the red dye by immersion in a 1 to 2% sodium bisulphite solution and are cleared of yellow by washing in warm water. The final photograph or portrait is thus colored realistically with the face and exposed skin areas a normal flesh color.

Intensification of negatives

The method or process heretofore outlined has been described as applied to black-and-white photographs, portraits or film transparencies to impart colors thereto. The method is also useful in increasing the intensifications of extremely "thin" negatives. By "thin" negative, is meant one having very little average silver density as well as slight tone differentiation (flatness). A negative may be flat with very short tone scale and yet the average density of the silver is intense, which means that although it is dark it is thin in tone scale. This latter type of negative should be reduced in Farmer's reducing agent until the thinnest portion of the silver is hardly visible before they are subjected to the method.

In intensifying the negative, the extremely "thin" negative is washed and then immersed in the chromic acid-sodium thiosulphate or hypo solution as heretofore described in the first stage of the method. The negative remains immersed for a sufficient period to permit "chromatization" to reach completion. The reaction will impart color ranging from red through yellow to pale silver and the picture will be more visible than before. Since printing and enlarging papers are ordinarily insensitive to the red end of the spectrum, this method achieves an extremely powerful intensification, whereby excellent prints may be obtained from a mediocre or poor negative.

The foregoing "chromatization" step may be sufficient but if it is felt necessary, the negative may be developed in a hydrosulphite developer. In any event and, if necessary, after "chromatization," the negative is washed free of any yellow stain by dipping the same in a suitable solution, such as a 0.5% sodium carbonate solution. To prevent softening the gelatin coating may be hardened by immersion for approximately three minutes in 5% formalin. It is noted that the method is preferably applied only to "thin" negative since otherwise the intensification would be so great as to defeat the purpose.

The methods described above are applicable to the usual fully developed black-and-white photograph or to the positive image films and transparencies. The particular grade of paper employed may be adapted to a specially desired result. However, it has been found that a grade 2 paper is well adapted when used in conjunction with a negative of average contrast.

The foregoing description of the invention is explanatory thereof and various changes in the solutions used, or their equivalents, as well as changes in the specific procedures described, may be made within the scope of the appended claims, without departing from the spirit of the invention.

What I claim and desire to secure by Letters Patent is:

1. A method of producing a multiple colored photographic image from an initial silver photographic image which includes reacting said initial image in a single immersion with a solution consisting solely of chromic acid and sodium thiosulphate in an amount with the ratio of chromic acid to sodium thiosulphate in the solution being adjusted so that the solution will convert certain portions of the image to silver chromate and will replace certain other portions of said image with chromium, the particular affect on each portion being in accordance with the density of the silver deposit in the various portions of the image.

2. In a method of producing a multi-colored photographic image from an initial silver photographic image, the steps of, immersing in a single immersion step said initial silver image in a solution consisting solely of chromic acid and sodium thiosulphate, the ratio of the chromic acid to the sodium thiosulphate being adjusted to cause certain portions of the image to be imparted with color by the reaction of the chromic acid with the silver, said colors being produced in accordance with the density of the silver deposit in said portions, then subjecting the colored image to the action of a sodium carbonate solution to halt further reaction of the chromic acid with the silver, and then immersing the image in a developing solution to blend the colors previously produced and to increase their brilliance.

3. In a method of producing a multi-colored photographic image from an initial silver photographic image, the steps of, imparting various colors to all of said image except the lighter areas thereof by subjecting the initial silver image by a single immersion step to the reaction of a solution consisting solely of chromic acid and sodium thiosulphate to impart color change to portions of the image, and then imparting a blue color to the unchanged lighter portions by subjecting the image to a blue toning process.

4. In a method of producing a multiple colored photographic image from an initial silver photographic image, the steps of, immersing said initial silver image in a solution consisting solely of chromic acid and sodium thiosulphate, the ratio of the chromic acid to the sodium thiosulphate in the solution being predetermined to cause certain portions of the image to be imparted with color by the reaction of the chromic acid with the silver, said colors being produced in accordance with the density of the silver deposit in said portions, then subjecting the colored image to the action of a sodium carbonate solution to halt further reaction of the chromic acid with the silver, then immersing the image in a developing solution to blend the colors previously produced and to increase their brilliance, and then subjecting the image to the action of a solution consisting of potassium ferricyanide, ferric chloride, oxalic acid and hydrochloric acid, whereby a blue color is imparted to all uncolored areas of the image without affecting the colors produced in the initial steps of the method.

5. The method set forth in claim 4, with the added step of applying a dye to the image.

6. A solution for producing a colored photographic image which consists of, 22 cc. of chromic acid of a strength approximately four and one quarter ounces to the quart of water, and 10 cc. of sodium thiosulfate solution of a strength approximately one and three quarter ounces to the quart, admixed in a pint of water.

7. The method of producing a multi-colored photographic image from an initial silver photographic image which comprises treating the initial image with a solution consisting of chromic acid and sodium thiosulphate and water.

8. The method of producing a multi-colored photographic image from an initial silver photographic image which comprises treating the initial image with a solution of approximately 22 cc. of chromic acid of a strength approximately four and one quarter ounces to the quart of water, approximately 10 cc. of sodium thiosulphate of a strength approximately one and three quarter ounces to the quart, and approximately one pint of water.

OLAN ROBERT HYNDMAN.

References Cited in the file of this patent

UNITED STATES PATENTS

| Number | Name | Date |
| --- | --- | --- |
| 809,651 | Vathis | Jan. 9, 1906 |
| 1,499,749 | Rehlander | July 1, 1924 |
| 1,899,972 | Mengele | Mar. 7, 1933 |
| 2,158,184 | Hickman et al. | May 16, 1939 |
| 2,158,185 | Hickman et al. | May 16, 1939 |
| 2,206,572 | Landis | July 2, 1940 |
| 2,341,079 | Bunting | Feb. 8, 1944 |
| 2,346,077 | Miller | Apr. 4, 1944 |
| 2,382,683 | Wadman et al. | Aug. 14, 1945 |